United States Patent Office
2,874,570
Patented Feb. 24, 1959

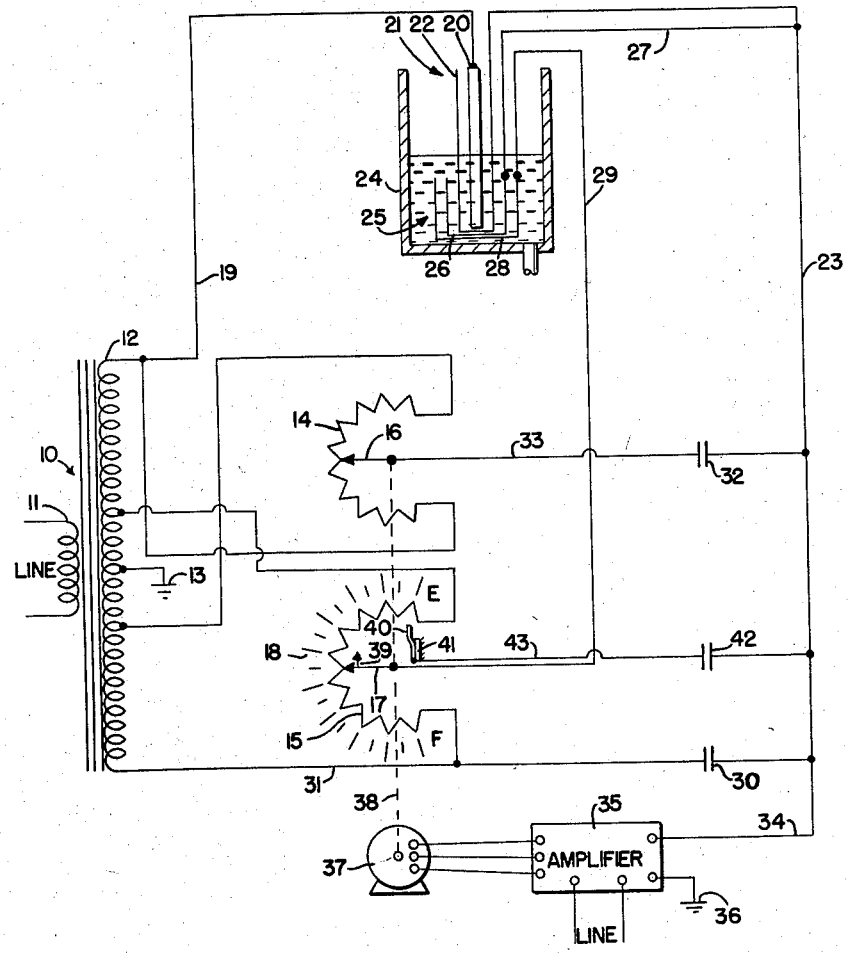

2,874,570

LIQUID LEVEL INDICATOR STABILIZATION

Raymond L. Bergeson, St. Paul, Minn., assignor to Minneapolis-Honeywell Regulator Company, Minneapolis, Minn., a corporation of Delaware Application August 16, 1955, Serial No. 528,741

4 Claims. (Cl. 73—304)

This invention relates to capacitive, 100% compensated liquid level measuring systems. In particular, the invention is directed to the elimination of wander or instability of the liquid level indicator pointer of such systems when the liquid in the container being measured reaches an empty condition.

A 100% compensated system consists of a measuring capacitor having a basic or empty tank capacitance and an additional capacitance which varies as a function of the dielectric constant and the height or volume of the liquid being measured in the tank. A compensating capacitor is located in the liquid which also has a basic or empty capacitance and an additional capacitance which varies as a function of the dielectric constant of the liquid only. The signal across the compensating capacitor is so arranged that it opposes the signal across the measuring capacitor so that the effect of the capacitance due to variations in the dielectric constant of the liquid is nullified. In addition, capacitors are provided which are arranged in the circuit in such a way as to nullify the signals due to the basic or empty tank capacitances of the measuring and compensating capacitors. The result is that the only signal which remains is of magnitude indicative of the height or volume of liquid in the tank.

In present capacitive, 100% compensated liquid measuring systems, as the level of the liquid in the container being measured reaches an empty condition, the pointer of the liquid level indicator of the system has a tendency to wander, and thus give an incorrect liquid level reading. The instability exhibited by the indicator pointer at the empty condition is due to the type of electrical network used in the capacitive, 100% compensated liquid level measuring system. Thus, when the liquid level in the container being measured reaches an empty condition, the currents set up in the system are as follows: a current due to the air capacitance of the probe capacitor, a current equal but opposite in phase due to the capacitance of the probe air capacitance compensator, a current due to the air capacitance of the dielectric constant compensator since there is no liquid in the dielectric constant compensator when an empty condition exists, and a current equal but opposite in phase due to the capacitance of the dielectric constant air capacitance compensator. Under these conditions as there is no unbalance, no signal would be transmitted to the electrical rebalancing means of the system. However, should a transient surge of current of the proper phase enter the system, and thus add an unbalanced current to the otherwise balanced system, such a transient signal would be transmitted to the rebalancing means causing a simultaneous change in the currents flowing through the dielectric constant capacitor and the dielectric constant air capacitance compensator. The simultaneous changes in currents are due to the resetting of rheostats associated with each the dielectric constant compensator and the dielectric constant air capacitive compensator. One of the rheostats serves as the liquid level indicator. Resetting of the rheostats has no effect as to balancing out the transient signal, as resetting of the rheostats and the ensuing current changes caused thereby are balanced at empty conditions. That is, resetting of the rheostats at empty condition produces equal currents but opposite in phase, and hence these have no effect on rebalancing the system. Thus, after movement of the indicator pointer has been affected, and after the transient current has disappeared, the indicator pointer (the wiper of the rheostat) would be at a position other than empty, and at empty condition no means exist for returning the indicator to the empty position, except for a surge current of the opposite phase being introduced into the system, as the system remains balanced regardless of the location of the indicator pointer at the empty condition.

The invention disclosed herein solves the problem of wander of the liquid level indicator pointer of a capacitive, 100% liquid level measuring system by the intentional introduction into the system of an electrical error signal of the proper phase at a predetermined minimum liquid level, which error signal causes an unbalance in the system to arise forcing the indicator pointer to the empty position.

An object of this invention is to provide means for a capacitive, 100% compensated liquid level measuring system to cause the liquid level indicator pointer to remain stable when the liquid in the container being measured reaches an empty condition.

This and other objects will become apparent upon a reading of the following specification and appended claims, wherein the single figure shows a capacitive, 100% compensated liquid level system containing one form of the invention.

Line power, from a source not shown, is introduced to the primary winding 11 of the power transformer 10. Secondary winding 12 of the transformer 10 is grounded at 13. Two voltage dividers 14 and 15 having wipers 16 and 17 respectively are each connected across a portion of the secondary winding 12. The voltage dividers are connected across the secondary winding 12 so that the voltage drop across one of them is equal to the voltage drop across the other for the same relative position of the wipers 16 and 17 but opposite in phase. Voltage divider 15 is associated with the calibrated dial 18, and thus voltage divider 15, wiper 17, and calibrated dial 18 serve as the liquid level indicator for the system.

To one end tap of the secondary winding 12, by means of lead 19, is connected the inner element 20 of a probe type capacitor 21. The outer element 22 of the probe 21 is connected to a common junction lead 23. The probe capacitor 21 is located in a liquid container 24 along with a dielectric constant compensator 25. The probe capacitor 21 and the dielectric constant compensator 25 may be of the type shown in the co-pending application Serial Number 290,957 filed May 31, 1952, by Robert D. Meyers, now Patent 2,754,457. Inner element 26 of the dielectric constant compensator 25 is connected to lead 27 which in turn is attached to the common junction lead 23. The outer element of the dielectric constant compensator 28 is connected to lead 29 which in turn is connected to wiper 17 of voltage divider 15.

To compensate for the air capacitance of the probe capacitor 21, the capacitor 30 is provided. One terminal of capacitor 30 connected by means of lead 31 to the end tap of secondary 12 opposite to which the probe capacitor 21 is connected. The other terminal of capacitor 30 is connected to the common junction lead 23. Further, to compensate for the air capacitance of the dielectric constant compensator 25, capacitor 32 is provided. One terminal of capacitor 32 is connected by means of lead 33 to the wiper 16 of voltage divider 14. The other terminal of capacitor 32 is connected to common junction lead 23. The value of the capacitances of capacitors 30 and 32 are such that they are equal to the air capacitance of the probe capacitor and the air capacitance of the dielectric constant compensator respectively.

Line power, from a source not shown, is transmitted to an amplifier 35 which can be of the type shown in the Upton Patent 2,423,534. The combined signal of the system is transmitted from the common junction lead 23 to the lead 34 which is connected to one input terminal of the amplifier 35, the other inlet terminal being grounded at 36. The output signal from the amplifier 35 is transmitted to a two phase motor 37, which turns in one direction or the other depending on the phase of the signal which it receives, causing simultaneous and proportional positioning of wipers 16 and 17 of voltage dividers 14 and 15 respectively, as the wipers 16 and 17 are connected to the positioning arm 38 of the motor 37.

The foregoing enumeration of elements and their system make-up constitutes what is commonly known as the capacitive, 100% compensated liquid level system and is similar to that shown in the co-pending application Serial No. 265,010, filed January 4, 1952 by Harry M. Hermanson, now Patent 2,769,338.

Wiper 17 of voltage divider 15 has a switch contact 39 attached thereto. The mating switch contact 40 is attached to an insulating member 41 which is rigidly secured in an appropriate manner. Switch contact 40 is connected to a terminal of capacitor 42 by means of lead 43. The other terminal of capacitor 42 is attached to common junction lead 23.

*Operation*

Without the benefit of the invention of this disclosure, the device operates as follows:

With liquid in the container 24 as shown, and the system electrically balanced, the total current flowing through the probe capacitor 21 and capacitor 32 equals the total current flowing through the dielectric constant compensator 25 and capacitor 30. If the liquid level of the container 24 should drop, the current through probe capacitor 21 would drop correspondingly, due to the lower dielectric constant of air compared to that of the capacitance of the liquid displaced thereby. The current through capacitor 30 would remain the same and so an electrical unbalance would result, causing the motor 37 to be rotated under the direction of the amplifier 35 causing thereby a repositioning of the wipers 16 and 17 of the voltage dividers 14 and 15 respectively until electrical balance is once more reestablished. This procedure continues until the tank is empty. At empty condition however, the current through probe 21 is the same as that through the capacitor 30, as the capacitance of the probe capacitor in air is equal to the capacitance of the capacitor 30. Likewise, the current through capacitor 32 equals that through the dielectric compensator 25, as the dielectric constant compensator 25 now has air for a dielectric. Thus, at empty conditions, no unbalance due to the current flow in the system itself can occur, and the system and therefore the indicator pointer (wiper 17) should be stable. This is not the case however, as transient surge currents, etc. arise that cause an unbalanced signal to be set up in the system. Such an unbalanced signal, if of the proper phase, causes the amplifier 35 and motor 37 to operate to try to alleviate the unbalance by changing the position of the wipers and thereby moving the pointer (wiper 17) away from the empty position of the calibrated dial 18. The operation of amplifier 35 and motor 37 continues until the transient current disappears. The pointer is now indicating a liquid level greater than empty, which is clearly an incorrect reading, however the system does not sense the error as the only currents in the system are due to air capacitance and these are already balanced. It will be noticed that the simultaneous movement of wipers 16 and 17 at empty condition causes corresponding increases, though opposite in phase, in the current flow through capacitor 32 and dielectric constant compensator 25 respectively, due to the manner in which the voltage dividers 14 and 15 are connected across the secondary winding 12 of transformer 10. If the unbalanced signal introduced into the system is of a phase which tends to move the indicator pointer to a position less than empty position no error would result as the wiper 17 is limited in such movement by member 41 which is rigidly secured in an appropriate manner.

By including in the system the invention of this disclosure, the stability of the liquid level indicator pointer of the system is restored. Thus, as the wiper 17 of voltage divider 15 reaches an empty position or near empty position, switch contact 39 engages switch contact 40 thereby placing capacitor 42 in the system in parallel with the dielectric constant compensator 25 causing an error signal to be set up in the system which has no balancing counterpart, and which is of such a phase as to cause the amplifier 35 and motor means 37 to constantly tend to turn the positioning arm 36 and associated wipers 16 and 17 toward the empty position of the calibrated dial 18.

There are other modifications of this invention that are possible, therefore, the scope of the invention should be determined by the following claims.

I claim:

1. In capacitive liquid level measuring apparatus an electrically balanceable bridge network comprising a power supply having a primary and secondary winding, a pair of voltage dividers and associated wiper means, each of said voltage dividers connected across a portion of said secondary winding and so connected that the voltage drop across one of said dividers is equal to but of opposite phase of the voltage drop across the other of said dividers for corresponding positions of said wipers, amplifier and associated motor means including a liquid level indicator, a probe type capacitive means, a dielectric constant compensator means, third capacitor means and fourth capacitor means for compensating for the air capacitance of said probe and dielectric constant compensator means respectively, one terminal of said probe means and of said third capacitor means connected to opposite end taps of said secondary winding, one terminal of said dielectric compensator means being connected to the wiper means of that one of said voltage dividers having a voltage drop of a phase opposite to the phase of the end tap to which the probe capacitor is connected, and one terminal of said fourth capacitor means being operatively connected to the other of said voltage dividers by said wiper means, the other terminals of said probe, dielectric constant, third and fourth capacitor means having a common connection, the combined signal from said probe, dielectric constant, third and fourth capacitor means being transmitted to said amplifier and motor means to cause simultaneous positioning of said wipers to rebalance said network upon a change in the level of liquid being measured, a fifth capacitor and a normally open switch means, said switch means closeable upon a predetermined minimum liquid level condition being obtained placing said fifth capacitor in parallel connection with said dielectric constant compensator means causing the introduction of an error signal into said system and causing thereby said liquid level indicator of said system to be stable and to continuously show an empty condition.

2. In capacitive liquid level measuring apparatus an electrically balanceable bridge network comprising a source of voltage having a variable voltage means, amplifier and associated motor means including a liquid level indicator, a probe type capacitor means connected to said source of voltage to produce a signal of a first phase, a dielectric constant compensator connected to said variable voltage means to produce a signal of a phase opposite to the phase of the signal produced by said probe capacitor, a first impedance means for compensating for the air capacitance of said probe capacitor and so connected to said source of voltage that the signal produced by said first impedance means is of a phase opposite to that of the phase of the signal produced by said probe capacitor, second impedance means for compensating for the air capacitance of said dielectric constant compensator and so connected to said variable voltage means that the signal produced is of a phase opposite to that of the phase of a signal produced by said dielectric constant compensator, said probe capacitor and dielectric constant compensator and said first and second impedance means having a common connection, the combined signal therefrom being transmitted to said amplifier and associated motor means to cause a change in the position of the variable voltage connection to thereby rebalance said network upon a change in the level of the liquid being measured, a third impedance means and switch means, said switch means, actuated upon a predetermined minimum liquid level condition being obtained placing said third impedance means in the said network thereby causing the introduction of an error signal into said system, said error signal tending to cause the liquid level indicator of said liquid level measuring system to continually show an empty condition.

3. Apparatus of the class described comprising, in combination: a first source of alternating voltage of a first phase; a second source of alternating voltage of variable magnitude and of a phase opposite the first phase; voltage responsive means having an input and an output; a capacitive liquid level sensing probe; means connecting said probe between said first source of voltage and the input of said voltage responsive means; a dielectric constant compensating capacitor; means connecting said compensating capacitor between said second source of voltage and the input of said voltage responsive means; a third capacitor; means connecting said third capacitor between said second source of voltage and the input of said voltage responsive means; a fourth capacitor; means connecting said fourth capacitor between said first source of voltage and the input of said voltage responsive means; impedance means; switch means operable to connect said impedance means between said second source of voltage and the input of said voltage responsive means; and motor means connected to the output of said voltage responsive means, operable between limits to vary the magnitude of said second voltage source and to operate said switch means at a predetermined point between said limits.

4. In capacitive type fluid level sensing apparatus, the combination comprising: a capacitive probe, having a basic capacitance, situated in the fluid to be sensed; a source of voltage connected to said probe to produce an electrical signal of a first phase and of magnitude dependent in part upon the basic capacitance of the probe and in part upon the level and the dielectric constant of the fluid in the probe; a second source of voltage of a second phase opposite to the first phase; a second capacitor connected to said second voltage source to produce an electrical signal of magnitude opposite to the signal produced by the basic capacitance of said probe; a dielectric constant compensating capacitor, having a basic capacitance, situated in the fluid to be sensed; a third voltage source of the second phase connected to said compensating capacitor to produce an electrical signal of magnitude dependent in part upon the basic capacitance of the compensating capacitor and in part upon the dielectric constant of the fluid therein; a fourth source of voltage of the first phase; a fourth capacitor connected to said fourth source of voltage to produce an electrical signal of magnitude equal to the signal produced by the basic capacitance of the compensating capacitor; means joining said capacitors to a common point; voltage responsive means having an input connected to the common point and having an output movable through a range; impedance means; and switch means operable by the movable output of said voltage responsive means at a predetermined point in its range to connect said impedance means between one of said sources of voltage and the common point.

References Cited in the file of this patent

UNITED STATES PATENTS 2,699,523    Meyer _____ Jan. 11, 1955
2,738,673    Campani _____ Mar. 20, 1956